US007734586B2

(12) United States Patent
Mohler et al.

(10) Patent No.: US 7,734,586 B2
(45) Date of Patent: *Jun. 8, 2010

(54) REPLICATION AND SYNCHRONIZATION OF SYNDICATION CONTENT AT AN EMAIL SERVER

(75) Inventors: Lane Richard Mohler, Arvada, CO (US); Gregory A. Reinacker, Highlands Ranch, CO (US)

(73) Assignee: Newsgator Technologies, Inc., Denver, CO (US)

( * ) Notice: Subject to any disclaimer, the term of this patent is extended or adjusted under 35 U.S.C. 154(b) by 211 days.

This patent is subject to a terminal disclaimer.

(21) Appl. No.: 11/403,176

(22) Filed: Apr. 12, 2006

(65) Prior Publication Data

US 2007/0244901 A1 Oct. 18, 2007

(51) Int. Cl.
*G06F 17/30* (2006.01)
(52) U.S. Cl. ...................... 707/628; 707/633
(58) Field of Classification Search ............... 707/1, 707/3, 10, 100, 104.1; 709/206
See application file for complete search history.

(56) References Cited

U.S. PATENT DOCUMENTS

| | | | | |
|---|---|---|---|---|
| 6,018,762 | A * | 1/2000 | Brunson et al. | 709/206 |
| 6,725,239 | B2 * | 4/2004 | Sherman et al. | 707/201 |
| 2005/0141542 | A1 * | 6/2005 | Handekyn et al. | 370/437 |
| 2005/0165615 | A1 | 7/2005 | Minar | |
| 2005/0289147 | A1 | 12/2005 | Kahn | |
| 2006/0010095 | A1 | 1/2006 | Wolff | |
| 2006/0155698 | A1 * | 7/2006 | Vayssiere | 707/6 |
| 2006/0230021 | A1 * | 10/2006 | Diab et al. | 707/3 |
| 2006/0288011 | A1 * | 12/2006 | Gandhi et al. | 707/10 |
| 2006/0288329 | A1 | 12/2006 | Gandhi | |
| 2007/0011665 | A1 * | 1/2007 | Gandhi et al. | 717/136 |
| 2007/0022174 | A1 | 1/2007 | Issa | |
| 2007/0038712 | A1 * | 2/2007 | Affronti et al. | 709/206 |
| 2007/0094321 | A1 * | 4/2007 | Nussey et al. | 709/200 |
| 2007/0124285 | A1 * | 5/2007 | Wright et al. | 707/3 |
| 2007/0192401 | A1 | 8/2007 | Weakliem | |
| 2007/0244895 | A1 | 10/2007 | Mohler | |
| 2008/0126476 | A1 | 5/2008 | Nicholas | |

OTHER PUBLICATIONS

Fagan Finder, "All About RSS", Feb. 19, 2004, http://www.faganfinder.com/search/rss.php, 8 pages.*
Press Release—NewsGator Online Services Provides Access to Exciting New Content from Multiple Devices and Platforms http://www.newsgator.com/news/archive.aspx?post=29; Jan. 7, 2004; 4 pages; Las Vegas, NV and Denver, CO.
Press Release—NewsGator Online Edition Free to Consumers, http://www.newsgator.com/news/archive.aspx?post=48; Oct. 18, 2004; 4 pages; Denver, CO.

(Continued)

*Primary Examiner*—Cam-Linh Nguyen
(74) *Attorney, Agent, or Firm*—Cooley LLP

(57) ABSTRACT

A system and method for providing content to an enterprise is described. One embodiment includes receiving, from each of a plurality of users within an enterprise, subscription information, which indicates content feeds that each corresponding user desires to receive content from and retrieving content items from a plurality of feeds. The content items are stored in a first data store and at least a portion of the content items are replicated in a second data store that is utilized by an email message system of the enterprise so as to enable each of the plurality of users to view content items via the email message system.

16 Claims, 4 Drawing Sheets

OTHER PUBLICATIONS

Press Release—INF: How NewsGator interacts with the NGOS synchronization system; http://newsgator.mykbpro.com/Article_D6BDB.aspx; Jan. 20, 2004; 2 pages.

U.S. Appl. No. 11/403,180, entitled *Syndication of Content Based Upon Email User Groupings*, filed Apr. 12, 2006.

* cited by examiner

REPLICATION AND SYNCHRONIZATION OF SYNDICATION CONTENT AT AN EMAIL SERVER

RELATED APPLICATIONS

The present application is related to commonly owned and assigned application Ser. No. 11/403,180, entitled Syndication of Content Based Upon Email User Groupings, filed herewith, which is incorporated herein by reference.

FIELD OF THE INVENTION

The present invention relates generally to systems and methods for accessing content, and more particularly to systems and methods for accessing and aggregating web-based content.

BACKGROUND OF THE INVENTION

Millions of web pages are available as a source of news content for users of the Internet. These web pages take many forms, including, for example, articles, blurbs, and web logs ("blogs"), among others. In one approach, news content is published by inserting it into a web page (e.g., coding it into a HyperText Markup Language (HTML) file), which can then be viewed using a web browser.

There are drawbacks, however, to this approach. Users who wish to see content from a variety of sources must typically visit many different web sites. In addition, if the user later wants to obtain the most current content from all the sources, they must visit all the different web sites again. This is very time consuming, especially if the user is interested in many different types of content and/or sources.

One possible solution is a software application that automatically visits a number of web sites, extracts and presents content directly to the user. In particular, "feeds" have been developed as a way to publish news content in a structured format that facilitates identification and analysis. A feed (also known as a "news feed" or "blog feed") can contain items (e.g., news items), metadata about the articles (e.g., title, date, and author), and/or metadata about the feed itself (e.g., title, URL, and last-updated timestamp). Some feeds are described by Resource Description Framework (RDF) statements and/or encoded using eXtended Markup Language (XML) (such as, e.g., the XML syntax RDF/XML, RSS, Atom). These features of feeds make it easier for applications to automatically collect and evaluate news content for presentation to the user.

The term "syndication XML" refers to XML that has been developed for feeds, such as Atom and RSS ("Really Simple Syndication," "Rich Site Summary," or "RDF Site Summary"). Since the general structure of a feed is known, it is possible to identify the news content within it. Software applications have been developed that work with content published using syndication XML.

Applications and/or application handlers, commonly known as "feed viewers," "feed readers," or "feed aggregators," are capable of reading the syndication XML and presenting it to the user. These applications, may be implemented as on-line services and many support "aggregation," which enables a user to specify multiple feeds and integrate their content into a single feed.

In the context of an enterprise environment (e.g., a commercial, educational or governmental), it is desirable to provide personnel with particular content so that, for example, personnel are kept up to date on industry news, company news and/or current events generally. Some enterprises allow personnel within the enterprise to access feeds by allowing them to utilize web browsing resources (e.g., browser-enabled computers) owned by the enterprise, but problematically, the enterprises are often unable to manage the particular feeds accessed by personnel. In other enterprises, personnel do not have access to the Internet, and as a consequence, they are unable to access any content feeds at all.

Although present systems may be marginally functional, they are not sufficiently efficient or otherwise satisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In accordance with several embodiments, the present invention can provide a system and method for providing content to an enterprise. One embodiment includes receiving, from each of a plurality of users within an enterprise, subscription information, which indicates content feeds that each corresponding user desires to receive content from and retrieving content items from a plurality of feeds. The content items are stored in a first data store and at least a portion of the content items are replicated in a second data store that is utilized by an email message system of the enterprise so as to enable each of the plurality of users to view content items via the email message system.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
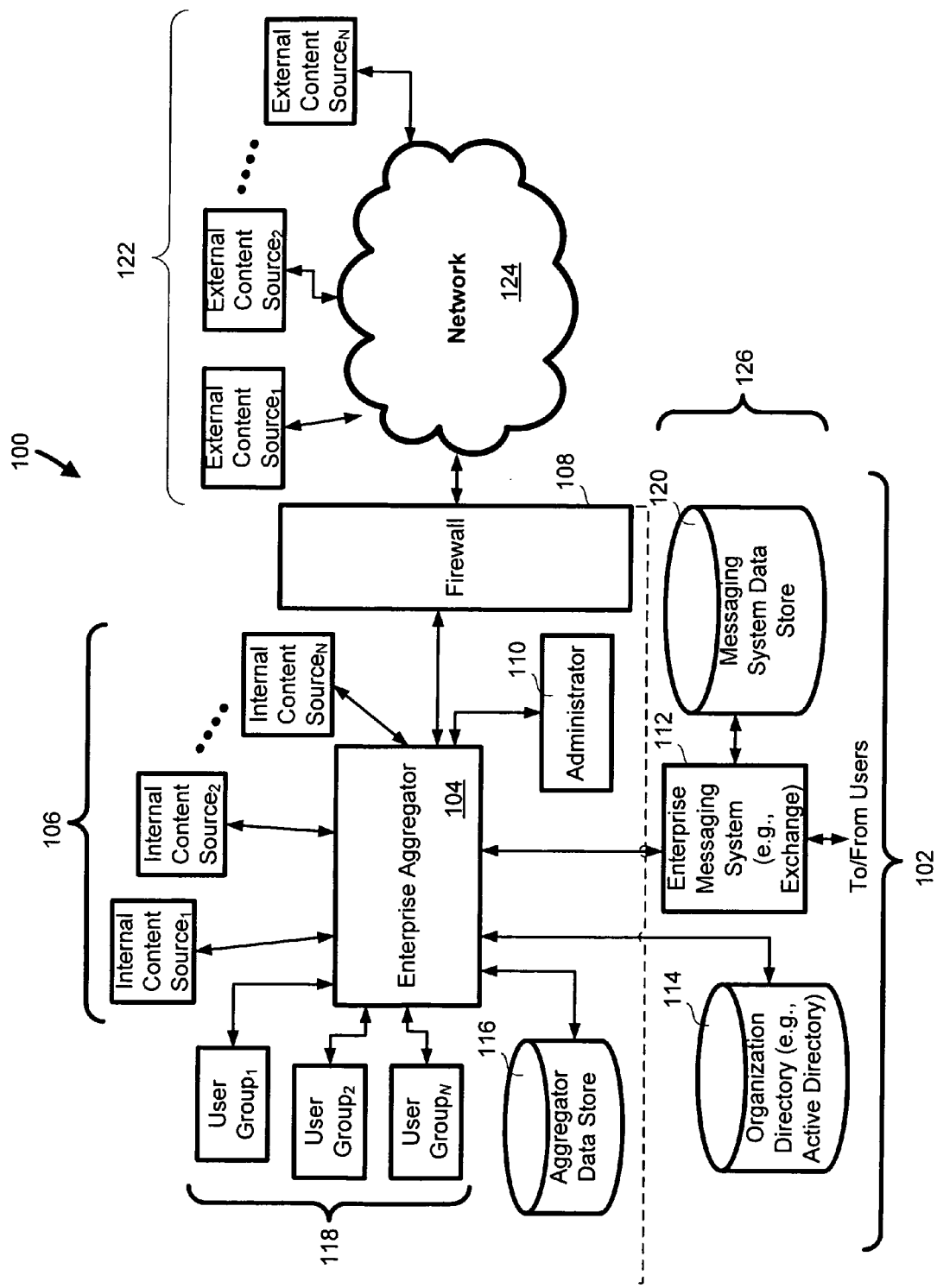
FIG. 1 is a block diagram depicting an environment in which the present invention may be implemented.

Referring now to the drawings, where like or similar elements are designated with identical reference numerals throughout the several views, and referring in particular to FIG. 1, which illustrates a block diagram of an environment 100 in which several embodiments of the present invention may be implemented.

As shown, an enterprise 102 in this embodiment includes an enterprise aggregator 104 that is coupled to N internal content sources 106, a firewall 108, a system administrator 110, an enterprise email messaging system 112, and organization directory 114, an aggregator data store 116 and N user groups 118. As shown, the email messaging system 112 is coupled to a data store 120 and the firewall 108 is coupled to N external content sources 122 via a network 124 (e.g., the Internet).

The enterprise 102 in the exemplary embodiment may be any type of entity including, for example, a commercial entity, educational entity and/or governmental entity. As depicted in FIG. 1, the enterprise 102 includes components 126, which may be found in any enterprise: the enterprise messaging system 112 and data store 120 as well as an organization directory 114.

The enterprise messaging system 112 may be any type of email system that is utilized by personnel of the enterprise 102. The enterprise messaging system 112 may be an email system sold under the trade name of Exchange, but this is certainly not required. The messaging system data store 120 in the exemplary embodiment is a data store that is utilized by the enterprise messaging system 112 to store content communicated to and/or from personnel within the enterprise 102.

The organization directory 114 is a data store of information about personnel of the enterprise 102 including information about which personnel are categorized into each of the user groups 118. In the exemplary embodiment, the organization directory 114 includes a listing of personnel within each of the user groups 118. The organization directory 114 may be a directory that is sold under the trade name of Active Directory, but this is certainly not required. In several embodiments, the organization directory 114 is present in the enterprise 102 before the enterprise aggregator 104 is deployed. The organization directory 114 in some embodiments is utilized for other purposes including, for example, group email distribution.

In some embodiments, as described further herein, the aggregator 104 is configured to receive (e.g., via a local area network (not shown)) subscription information from users within one or more of the user groups 118 to generate data defining a subscription to selected feeds made available by the N internal content sources 106 and/or the N external content sources 120. In the exemplary embodiment, the subscription data is stored in the aggregator data store 116 in connection with other information about the user (e.g., a username and password).

In addition, the aggregator 104 periodically retrieves (e.g., every hour) and stores content items (e.g., news items) from each of the content feeds 106, 120 in order to gather content and make information available to users about the content that is available from each of the content feeds. In some embodiments, the enterprise aggregator 104 receives content items in a syndication format (e.g., RSS) and parses the content items into its constituent components before storing the parsed content items in a relational format in the aggregator data store 116, which may be an SQL database.

The aggregator 104 in several embodiments is realized by a combination of software and hardware. In many embodiments, for example, the aggregator 104 is implemented by software executed by a general purpose computer to effectuate functions described further herein. One of ordinary skill in the art will recognize in view of this disclosure that the enterprise aggregator 104 may be realized by one or more physical components that may be integrated into one location or may be distributed.

The network 124 in several embodiments includes the Internet and may also include wide area networks and local area networks as well. The external content sources 122 in this embodiment are web sites that make content (e.g., news content) available via feeds (e.g., RSS feeds) that are accessed by the enterprise aggregator 104. The internal content sources 106 in the exemplary embodiment are internal syndication sources, which include content that is fed from sources within the enterprise. As an example, one of the internal content sources may include content managed by a human resources department, another internal content source may be managed by a marketing department and yet another internal content source may be managed by an engineering department.

These internal content sources 106 may communicate with the enterprise aggregator 104 using HTTP, but is contemplated that the internal content sources 106 may communicate with the enterprise aggregator 104 using other protocols as well.

Each of the user groups 118 in the exemplary embodiment is a collection of users that may be categorized, for example, by the organization they belong to within the enterprise. As an example, one group of the users 118 may be personnel within a human resources department, another group may be personnel within a marketing department and yet another group may be personnel within an engineering department. It should be recognized that these categories are merely exemplary and the user groups may be organized by any desired set of categories.

The administrator 110 in the present embodiment is an interface to the enterprise aggregator 104, which enables one or more administrators within the enterprise 102 to manage the content sources 106, 122 that each of the user groups 118 is subscribed to. In this way, if management personnel of the enterprise do not want to allow the individual users to select which content sources they would like to receive content from, then an administrator may conveniently subscribe a particular user group to selected content sources 106, 122.

Even if the enterprise 102 allows individual users to subscribe to their own feeds, the exemplary embodiment advantageously allows one or more administrators to manage at least a portion of the users' subscriptions. In this way, the individual users may benefit from an administrator's selections. As an example, administrators of the enterprise 102 may, as part of their assigned duties, identify particular content sources that may be beneficial for particular user groups to be subscribed to.

Beneficially, in the exemplary embodiment, the enterprise aggregator 104 is coupled to the organization directory 114 so that the administrator 110 need not be aware of the identity of each individual within each user group. As a consequence, subscriptions for particular groups of users may be easily established.

In several embodiments, the enterprise aggregator 104 is configured to enable content from the content sources 106, 122 to be emailed to the users that subscribe to the content sources. In the present embodiment, for example, content in the aggregator data store 116 is replicated to the messaging system data store 120 to enable content items to be emailed via the enterprise messaging system 112 to the user groups 118. In this way, users that do not have access to a web browser are able to receive and view content from content sources that they would ordinarily not be able to view. Moreover, many users are familiar, and hence, comfortable with the email environment of the enterprise messaging system 112.

In accordance with many embodiments, as discussed further herein, in addition to replicating content between the aggregator data store 116 and the messaging system data store 120, the enterprise aggregator 104 synchronizes at least some of the metadata that is associated with content items that are stored in both of the data stores 116, 120. In this way, if a user changes metadata of a content item that is stored in the messaging system data store 120 the change is reflected at the aggregator data store 116 and vice versa.

The metadata may be an explicit indication that the user has read the content item, has not read the content item, has deleted the content item and/or an indication that the user has clipped content to a folder. With respect to clippings, the metadata includes information identifying the user and the item that the user clipped. It is also contemplated that other information may be captured and stored as metadata including, for example, tags, ratings and/or other annotations, which may then be associated, in the data stores 116, 120, with a content feed, content item and/or a user.

In some variations, the enterprise aggregator 104 also synchronizes each user's folder hierarchy (i.e., the hierarchical arrangement of folders used to store content). In this way, if a user changes the hierarchy of their folders at the aggregator data store 116, the changes are reflected at the messaging system data store 120 and vice versa.

Figure 2:
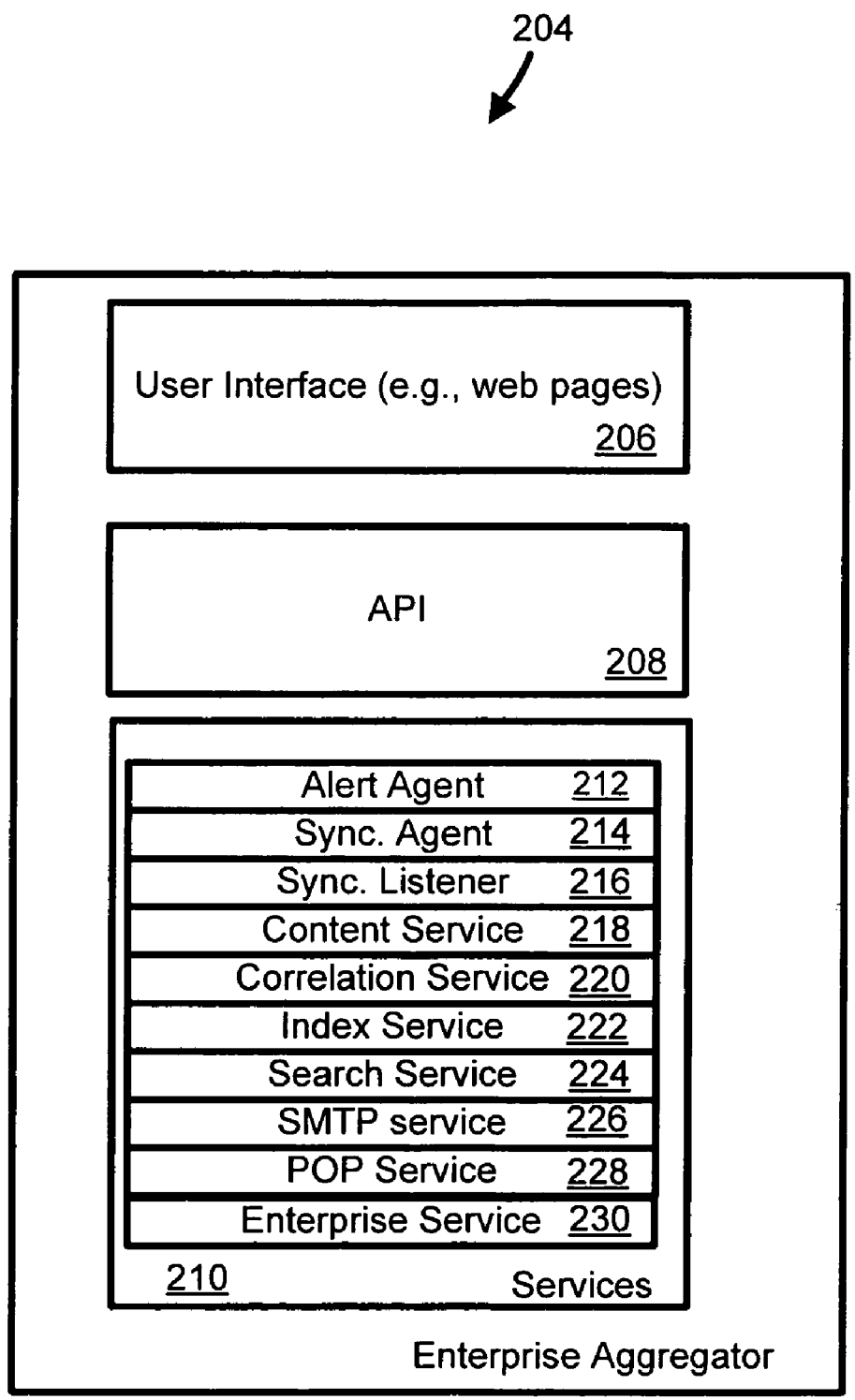
FIG. 2 is a block diagram depicting one embodiment of the enterprise aggregator depicted in FIG. 1.

Referring next to FIG. 2, shown is a block diagram depicting one embodiment of the enterprise aggregator 104 of FIG. 1. As shown, the enterprise aggregator 204 in this embodiment includes a user interface 206, an applications program interface (API) 208 and a services portion 210. As depicted, the services portion 210 includes an alert agent 212, a synchronization agent 214, a synchronization listener 216, a content service 218, a correlation service 220, an index service 222, a search service 224, an SMTP service 226, a POP service 228 and an enterprise service 230.

The illustrated components of the enterprise aggregator 204 may be implemented by software, hardware or a combination thereof, but it should be recognized that the arrangement of these components is logical and not meant to be an actual hardware diagram. Thus, the components can be combined or further separated in an actual implementation. Moreover, the construction of each individual component will be readily apparent in light of this disclosure to those of skill in the art.

In the exemplary embodiment of FIG. 2, the user interface is realized by a collection of web pages that may be, for example, Active Server Page Framework (ASPX) active server pages. The web pages allow personnel of the enterprise 102 to navigate to pages so as to access functions of the enterprise aggregator 204. As an example, one or more web pages may allow users to add or remove subscriptions to content sources 106, 122 to read the information that was in a feed, to define and organize folders, to organize their feeds in the folders, to mark information as read or unread, to organize information into locations, and to expose the information in those locations in other formats including, for example, Outline Processor Markup Language (OPML), which allows the users to list the feeds they subscribe to.

The API 208 in the exemplary embodiment is defined by a group of end points that any application that has authorization can talk to (e.g., to retrieve information). The end points may include clippings (e.g., RSS clippings), which enable users to call to retrieve a list of all of their clippings. In operation, the API 208 is utilized by the user interface 206 to call, for example, the clippings in order to display the retrieved clippings.

The services 210 in the exemplary embodiment are autonomous units that run as a service under an operating system (e.g., Windows)(not shown) of the aggregator 204, and as a consequence, the services in the exemplary embodiment run in the background. The alert agent 212 in the present embodiment receives indications of changes in the aggregator data store 116. For example, if a user marks a content item as read, the alert agent 212 is informed that the item has been read through communication with the user interface 206 (e.g., a web site) using a distributed communication medium (e.g., message queuing). In addition, the alert agent 212 also schedules a polling interval, and monitors an amount of time since this user was last synchronized, and once a predefined interval (e.g., thirty minutes) is reached, the alert agent 212 fills a queue (e.g., under MSM queue) of requests which are then consumed by the synchronization agent 214.

The synchronization agent 214 in this embodiment takes the request off the queue, and dialogs with the enterprise messaging system 112 (e.g., using the web distributed authoring and versioning (WebDAV) standard) to determine how much information it needs to send, and then it sends the necessary information to the enterprise messaging system 112. In other words, the alert agent 212 in connection with the synchronization agent 214 together perform the replication of content items from the aggregator data store 116 into the enterprise messaging system 112 and the synchronization of state from the aggregator data store 116 into the messaging system data store 120.

The synchronization listener 216 in the exemplary embodiment of FIG. 2, listens for alerts from the enterprise messaging system 112, and when the enterprise messaging system 112 alerts the synchronization listener 216 with an indication that a change has been made relative to a content item stored in the messaging system data store 120, the synchronization listener 216 synchronizes the changes from the enterprise messaging system 112 back to the aggregator data store 116. Thus, the alert agent 212, the synchronization agent 214 and the synchronization listener 216 enable the replication and synchronization with the enterprise messaging system 112.

In some embodiments, the synchronization agent 214 and the synchronization listener 216 utilize a synchronization token to replicate content and synchronize metadata between the aggregator data store 116 and the messaging system data store 120. The token in these embodiments may record the state of a data store (e.g., as a string of characters) at the time it was issued or the token may indicate the time of the last change in the data store.

In one embodiment for example, when the synchronization agent 214 attempts to replicate information from the aggregator data store 116 to the messaging system data store 120, it retrieves a token with a time stamp of the last successful replication and then queries the aggregator data store 116 for any items added, changed, or deleted in the intervening interval. The synchronization agent 214 then replicates the information into the messaging system data store 120 and updates the timestamp. The synchronization agent 214 also requests a synchronization token from the messaging system data store 120 and saves this as well.

In one implementation, when the synchronization listener 216 replicates information from the messaging system data store 120 to the aggregator data store 116 it first retrieves a synchronization token, which indicates the state of the messaging system data store 120 at the time when the messaging system data store 120 was updated, and queries the enterprise messaging system 112 for all changes to the state of a subset of the enterprise messaging system 112 since the synchronization token was issued. The synchronization listener 216 then effects the parallel changes to the aggregator data store 116, requests a synchronization token from the messaging system data store 120 and saves the synchronization token with updated state information.

The content service 218 in the exemplary embodiment is configured to periodically poll the content sources 106, 122 to determine whether the content sources have new content available. In one embodiment, for example, the content service 218 polls the content sources 106, 122 every hour, and the content sources 106, 122 send back information to the enterprise aggregator 104 so the enterprise aggregator 104 is able to determine whether the content sources 106, 122 have new content available. If new content is available, the enterprise aggregator 104 retrieves and stores the content in the aggregator data store 116.

The correlation service 220 in this embodiment is called by the content service 218 and the correlation service 220 keeps track of the correlation between feeds. In one embodiment for example, the strength of the correlation between pairs of feeds is determined by tracking instances where multiple users subscribe to the same feeds. This information is stored in the aggregator data store 116 and is utilized to determine the relative strength of the relationship between any two feeds. As a consequence, when a user has indicated an interest in a particular feed (e.g., by subscribing to the particular feed), recommendations can be made to other feeds on the basis that users that subscribed to the particular feed were also interested in the other feeds.

Also shown in the services portion 210 are an indexing service 222 and a search service 224. The indexing service 222 indexes information received in the aggregator data store 116 so as to create an index that enables information to be later retrieved by key word searching, and the search service 224 enables searches of the index to be carried out. In some implementations, "smart feeds" are created, which may be key word or URL based feeds that are generated from the information residing in the aggregator data store 116. For example, a feed may be generated by retrieving a collection of feeds that include a particular word or collection of words.

The simple mail transfer protocol (SMTP) service 226 in this embodiment receives information (e.g., content) from users via email and stores the information in the aggregator data store 116 in a manner that renders the information accessible in the same way as other information stored in the aggregator data store 116. In one embodiment for example, the information is stored in the aggregator data store 116 so as to be accessible as an RSS content item.

The post office protocol (POP) service in the exemplary embodiment functions as a POP server, which enables an email client that speaks POP to make a request for information in the aggregator data store 116. In response to the request, the POP service 228 will serve up the requested information (e.g., RSS information) in an email format.

Also shown in the services portion 210 is an enterprise service 230, which is configured to periodically poll the organization directory 114 to get, for example, information identifying the user groups 118 and/or information about the users in each of the user groups 118. The enterprise service 230 stores that information in the aggregator data store 116 so that it is available for later use. In this way, a locally cached version of information from the organization directory 114 may be used so that the organization directory 114 need not be accessed every time information is needed.

Figure 3:
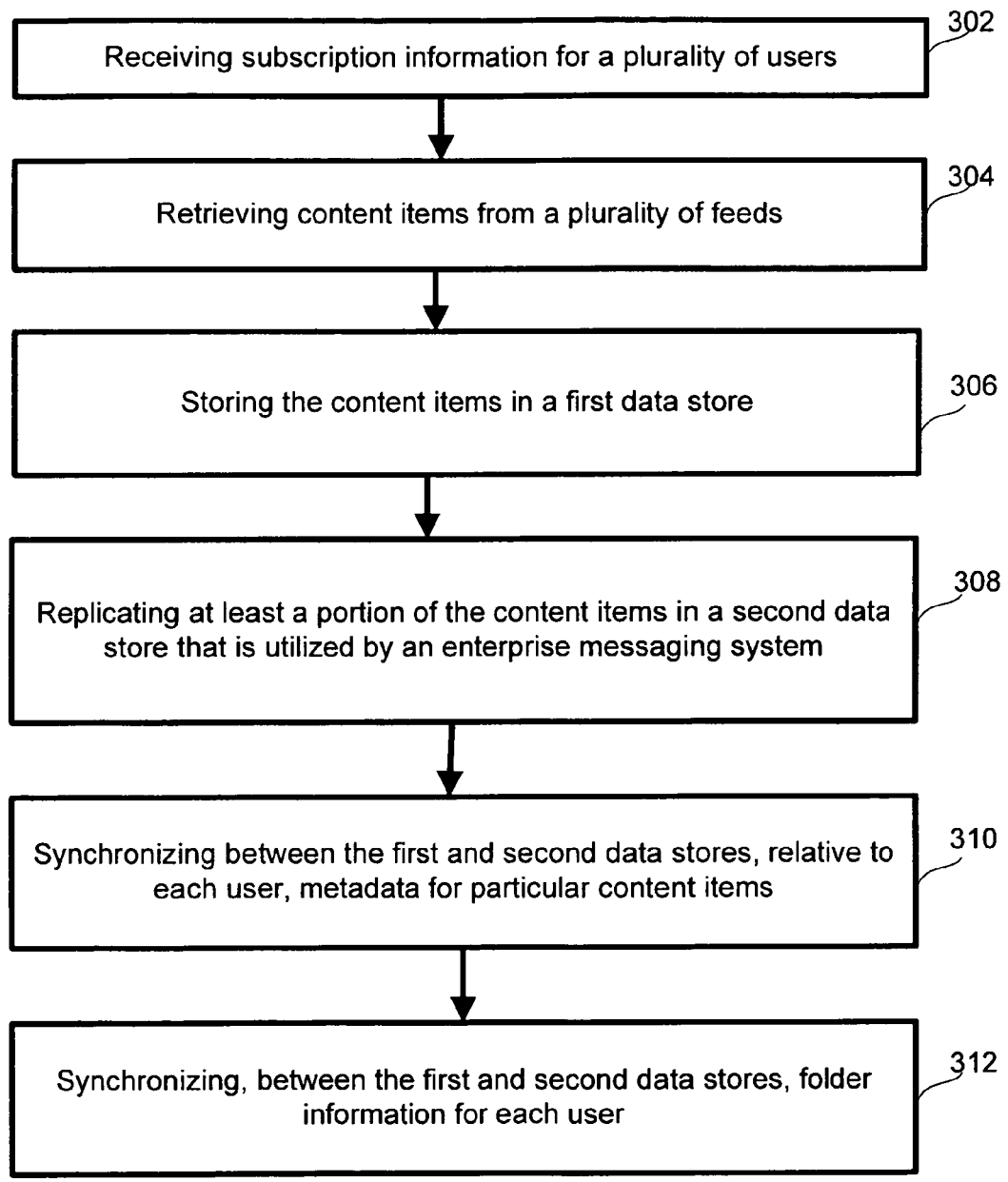
FIG. 3 is a flow chart depicting a method in accordance with one embodiment of the present invention.

Referring next to FIG. 3, shown is a flowchart depicting a method for providing content to users of an enterprise. Although simultaneous reference is made to FIG. 1, it should be recognized that the method depicted in FIG. 3 is not limited to implementation with the embodiments described with reference to FIG. 1.

As shown in FIG. 3, subscription information, which identifies selected content sources (e.g., from among the content sources 106, 122), is received for a plurality of users (Block 302). In some embodiments, personnel (e.g., users within the user groups 118) of an enterprise (e.g., the enterprise 102) are able to define their own subscriptions, and in other embodiments an administrator (e.g., the administrator 110) defines subscription information for the users. In yet other embodiments, both the users and the administrator are able to define subscription information for the users.

In the exemplary method depicted in FIG. 3, content items are retrieved from a plurality of feeds (e.g., content sources 106, 122) and stored in a first data store (e.g., the aggregator data store 116)(Blocks 304, 306). As shown, at least a portion of the content items are then replicated in a second data store (e.g., the messaging system data store 120), that is utilized by an enterprise messaging system (e.g., the enterprise messaging system 112). In this way, the replicated content items may be delivered to the users via email.

In addition, metadata that is associated with content items is synchronized between the first and second data stores (Block 310). Metadata, for example, may include information indicating whether the item has been read, deleted, flagged and/or an indication that the user has clipped content to a folder. The metadata may also include tags, ratings and/or other annotations, which may then be associated, in the data stores 116, 120, with a content feed, content item and/or a user.

As depicted in FIG. 3, folder information for each user is also synchronized 312 so that if a user makes changes to a folder hierarchy at one of the data stores (e.g., the messaging system data store 120), the change is also made at the other data store (e.g., the aggregator data store 116).

Figure 4:
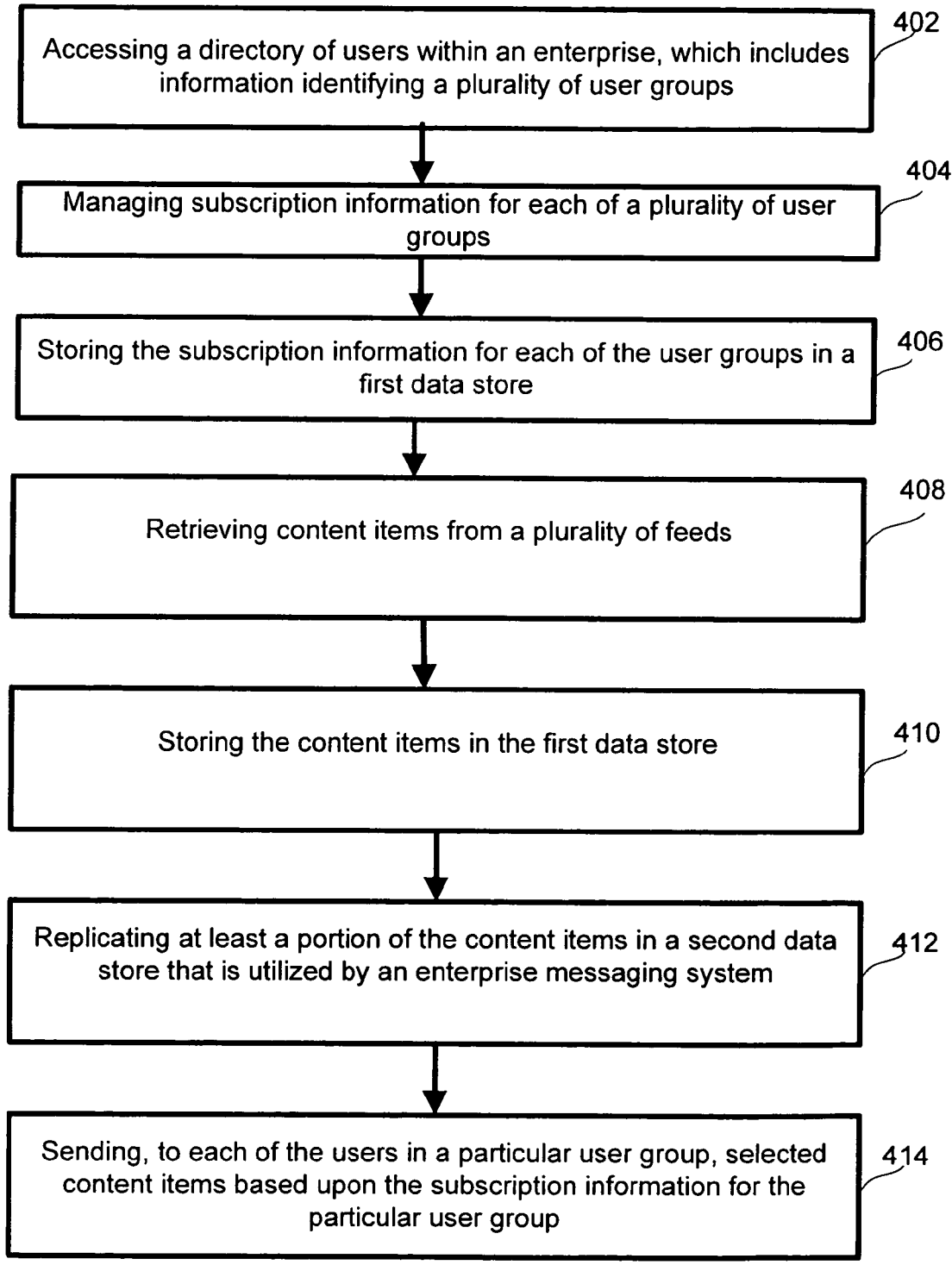
FIG. 4 is a flow chart depicting another method in accordance with another method of the present invention.

Referring next to FIG. 4, shown is a flowchart depicting another method for providing content to users in an enterprise. Although reference is made to FIG. 1, for exemplary purposes, it should be recognized that the method depicted in FIG. 4 is not limited to the embodiments described with reference to FIG. 1.

As shown, in this embodiment, a directory of users (e.g., the organization directory 114) is accessed to identify user groups within an enterprise (e.g., the enterprise 102)(Block 402), and subscription information is managed (e.g., by the administrator 110) for each of the user groups (e.g., the user groups 118)(Block 404) and stored in a first data store (e.g., the aggregator data store 116)(Blocks 404, 406). In some embodiments, users are unable to alter their subscriptions to content sources (e.g., the content sources 106, 122), but in other embodiments users are able to augment their subscription information so as to retrieve content from additional content sources over those which they are subscribed to by an administrator.

In this embodiment, content items from a plurality of feeds (e.g., from the content sources 106, 122) are retrieved and stored in a first data store (e.g., the aggregator data store 116)(Blocks 408,410), and then the content items are replicated in a second data store (e.g., the messaging system data store 120) that is utilized by an enterprise messaging system (e.g., the enterprise messaging system 120)(Block 412). As shown in FIG. 4, selected content items are sent to particular user groups based upon the subscription information for each user group (Block 414). In this way, syndicated content may be managed and distributed in an enterprise on a user-group by user-group basis; thus making it easy for administrators to direct the distribution of content in an enterprise which may have hundreds or thousands of users.

It should be recognized that although the methods depicted in FIGS. 3 and 4 may be independently carried out, this is certainly not required and that aspects of each method may be utilized in the other method, and if desired, the two methods may be combined.

In conclusion, the present invention provides, among other things, a system and method for providing content to users in an enterprise. Those skilled in the art can readily recognize in view of this disclosure that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for providing syndicated content to an enterprise comprising:

receiving, from each of a plurality of users within an enterprise, subscription information, wherein the subscription information for each user indicates content feeds that each corresponding user desires to receive content from;

retrieving content items from a plurality of feeds;

storing the content items in a first data store;

replicating at least a portion of the content items in a second data store that is utilized by an email message system of the enterprise so as to enable each of the plurality of users to view content items via the email message system;

assigning a status indicator to each of the content items replicated in the second data store; and synchronizing the first and second data stores so that each of the content items in each of the data stores is associated with the status indicator;

wherein content items received from users via email are stored in the first data store in a manner that renders them accessible to other users in the enterprise in the same manner as the content items retrieved from the plurality of feeds.

2. The method of claim 1 including:

determining whether each of the content items is a new content item relative to previously received content items; and assigning an indicator to each new content item that indicates each new content item is an unread content item.

3. The method of claim 1, wherein the indicator is selected from the group consisting of a read indicator, a deleted indicator and a flag.

4. The method of claim 1 including:

storing at both the first and second data stores, for each of the plurality of users, hierarchy information that is unique to each user, wherein the hierarchy information includes information defining a hierarchy of folders for storing content items; and synchronizing the hierarchy information at the first and second data stores so that a change in hierarchy information at one of the first and second data stores is also made at the other data store.

5. The method of claim 1, wherein the retrieving includes retrieving content items generated within the enterprise.

6. The method of claim 1, wherein the content feeds are content feeds selected from the group consisting of Atom feeds, RDF feeds and RSS feeds.

7. A system for providing content items to users within an enterprise comprising:

a processor;

a memory coupled to the processor;

a content service stored in the memory configured to retrieve content items from a plurality of feeds;

a data store configured to store the content items;

a web page server configured to serve web pages including:

a subscription web page, which enables each of the users to enter subscription information, wherein the subscription information for each of the users indicates the content feeds that each of the users desires to receive content from;

an administrator subscription web page for defining user group subscription information for each of the users, wherein the user group subscription information is associated with at least one user group of each user, the user group subscription information being uneditable by the users; and a presentation web page, which enables each of the users to view content items from the data store and to alter a status of a content item; and a sync agent configured to cause the processor to replicate and send at least a portion of the content items to an email message system of the enterprise so as to enable each of the users to view content items via a second data store of the email message system; and an alert agent configured to:

receive an indication that a user has altered a status indicator of a content item; and enter a request, in a queue for the sync agent, to update the second data store with the altered status indicator;

wherein the sync agent is configured to take the request off the queue and communicate the alteration of the status indicator via the email message system of the enterprise so as to synchronize the status indicator of the content item, relative to the user, at the first and second data stores.

8. The system of claim 7, including:

a sync listener configured to:

receive an alert from the email message system, wherein the alert indicates a change in a status of a content item; and enter a request, in a queue for the sync agent, to update the first data store with the altered status;

wherein the sync agent is configured to take the request off the queue and effectuate the change in status of the content item in the first data store so as to synchronize the status of the content item, relative to the user, at the first and second data stores.

9. The system of claim 7, wherein the web page server is configured to serve a web page that enables each user to create a collection of folders for storing content items.

10. The system of claim 9, wherein the sync agent is configured to synchronize the collection of folders in the first data store with a second collection folder in the second data store.

11. The system of claim 7, wherein the content feeds are content feeds selected from the group consisting of Atom feeds, RDF feeds and RSS feeds.

12. A system for providing syndicated content items to users within an enterprise comprising:

an enterprise email server configured to provide email messaging services to a plurality of users in the enterprise;

a messaging server data store coupled to the enterprise email server, wherein the messaging server data store is configured to store content items for each of the plurality of users; and a content aggregator disposed behind a firewall of the enterprise and coupled to the enterprise email server, wherein the content aggregator is configured to:

retrieve, into an aggregator data store, content items from a plurality of content feeds outside of the firewall and replicate the retrieved content items in the messaging service data store so as to enable each of the plurality of users to view content items via the email message system;

assign a status indicator to each of the content items; and synchronize the messaging server data store and the aggregator data store so that the particular content item at each of the data stores is associated with the status indicator;

wherein content items received from users via email are stored in the aggregator data store in a manner that renders them accessible to other users in the enterprise in the same manner as the content items retrieved from the plurality of content feeds.

13. The system of claim 12, wherein the indicator is selected from the group consisting of a read indicator, a deleted indicator and a flag.

14. The system of claim 12, wherein the content aggregator is configured to enable each of the plurality of users to generate a hierarchy of folders for storing the content items and to synchronize the hierarchy of folders between the aggregator data store and the messaging server data store.

15. The system of claim 12 wherein the content aggregator is communicatively coupled to the plurality of users in the enterprise, and wherein the content aggregator is configured to enable each of the plurality of users to subscribe to particular ones of the plurality of content feeds.

16. The system of claim 12, wherein the content feeds are content feeds selected from the group consisting of Atom feeds, RDF feeds and RSS feeds.

* * * * *